(12) United States Patent
Radelet et al.

(10) Patent No.: US 6,864,427 B2
(45) Date of Patent: Mar. 8, 2005

(54) ENCLOSING DEVICE AND METHOD

(75) Inventors: Christiaan Radelet, Scherpenheuvel (BE); Johan Legrand, Nieuwrode (BE)

(73) Assignee: Tyco Electronics Raychem N.V. (BE)

( * ) Notice: Subject to any disclaimer, the term of this patent is extended or adjusted under 35 U.S.C. 154(b) by 9 days.

(21) Appl. No.: 10/467,310

(22) PCT Filed: Feb. 5, 2002

(86) PCT No.: PCT/GB02/00503
§ 371 (c)(1),
(2), (4) Date: Aug. 4, 2003

(87) PCT Pub. No.: WO02/063737
PCT Pub. Date: Aug. 15, 2002

(65) Prior Publication Data
US 2004/0065467 A1 Apr. 8, 2004

(30) Foreign Application Priority Data
Feb. 7, 2001 (GB) .............................. 0102976

(51) Int. Cl.[7] ................................................ H02G 3/06
(52) U.S. Cl. ...................................................... 174/93
(58) Field of Search ........................ 174/93, 92, 88 R

(56) References Cited

U.S. PATENT DOCUMENTS

| | | | | |
|---|---|---|---|---|
| 4,438,294 A | * | 3/1984 | Meltsch et al. | 174/88 R |
| 4,498,938 A | * | 2/1985 | Moisson et al. | 156/49 |
| 4,607,866 A | | 8/1986 | Erlichman | 285/45 |
| 4,839,472 A | | 6/1989 | Pichler | 174/92 |
| 5,324,564 A | | 6/1994 | Chiotis et al. | 428/124 |
| 6,148,830 A | * | 11/2000 | Chen | 132/321 |
| 6,497,414 B1 | * | 12/2002 | Roosen | 277/314 |

FOREIGN PATENT DOCUMENTS

| CN | 1196558 | 10/1998 |
|---|---|---|
| DE | 90 01 931.8 | 6/1990 |
| DE | 195 19 367 | 11/1996 |
| EP | 0 695 014 | 1/1996 |
| EP | 0 750 378 | 12/1996 |
| GB | 2 054 781 | 2/1981 |
| GB | 2 061 025 | 5/1981 |
| GB | 2 314 111 | 12/1997 |
| WO | 93/21392 | 10/1993 |
| WO | 97/09391 | 3/1997 |
| WO | 01/82435 | 11/2001 |

OTHER PUBLICATIONS

International Search Report for PCT/GB 02/00503.
International Preliminary Examination Report for PCT/GB 02/00503.
Great Britain Search Report for GB 0102976.8.

* cited by examiner

Primary Examiner—Chau N. Nguyen
(74) Attorney, Agent, or Firm—Myers Bigel Sibley & Sajovec

(57) ABSTRACT

A device for enclosing an elongate object (20), such as a cable splice, including a flexible sheet (2) which can be laid around the elongate object and secured by support members (5, 6) attached to edges (3, 4) of the sheet. The support members (5, 6) may be hinged half-shells. The flexible sheet (2) may be a gel layer and/or a rubber layer which is stretched when the device is applied.

18 Claims, 3 Drawing Sheets

ENCLOSING DEVICE AND METHOD

RELATED APPLICATIONS

The present application is a National Phase application of PCT/GB02/00503 filed on Feb. 5, 2002 and published in English, which claims priority from Application GB 0102976.8 filed on Feb. 7, 2001.

The present invention relates to a device and a method for enclosing objects, in particular elongate objects such as cables, cable joints and cable transitions. More in particular the present invention relates to a device and a method for environmentally protection an elongate object by means of at least a sealing material.

BACKGROUND OF THE INVENTION

It is well known to use a flexible material for environmentally enclosing and/or sealing an elongate object. For cable splices materials such as rubber, gel and gel/rubber combinations are used. Examples of such use are disclosed in WO 97/09391 (Raychem), WO 97/08797 (Raychem) and EP 0 880 212 (Raychem).

Usually a strip of sealing material is wound around the elongate object and is subsequently compressed by applying tape or a hard-shelled closure body.

In some applications it is difficult to wind a strip of material around an elongate object. In antenna poles for mobile telephone systems, for instance, the coaxial cable feeding the antenna is often mounted very close to the post, leaving little room for winding a strip of sealing material around the antenna connector. However, as it is normally undesirable to remove or even disconnect such a connector for the purpose of installing an enclosure, the enclosing device has to be of the "wrap-around" type.

In the case of antenna poles, as in other applications, it is advantageous if the device to be installed has few separate parts, as parts can easily be dropped and/or lost.

SUMMARY OF THE INVENTION

It is therefore an object of the present invention to provide a device for enclosing an elongate object which is of the "wrap-around" type but does not require strips of material to be wound around the elongate object.

It is another object of the present invention to provide a device for enclosing an elongate object which is easy to install, even when little space is available.

It is a further object of the present invention to provide a device for enclosing an elongate object which consists of few parts.

Accordingly, the present invention provides a device for enclosing an elongate object, which device comprises a flexible sheet having two substantially parallel edges and two support members provided with engagement means for mutually engaging the support members wherein each support member extends along a respective edge of the flexible sheet and is attached thereto so that the device may be closed around the elongate object. By securing the edges of a flexible sheet by means of mutually engageable support members, the sheet can be closed around the elongate object. Such a device is "wrap-around" yet requires no winding of the sheet around the object. The support members may provide a longitudinal seal by pressing the edges of the sheet together. Preferably, the width of the sheet is chosen such that some tension has to be applied to close the device. The resulting tension in the flexible sheet enhances the sealing properties of the device.

The flexible sheet preferably comprises a gel. It is well known that gel under compression has excellent sealing properties. The inventors have found that gel under tension also provides an excellent seal. Instead of, or in addition to a gel another elastomer may be used, such as natural or synthetic rubber. Especially a sheet comprising a rubber carrier layer on which a gel layer is applied is advantageous, as the rubber maintains the applied tension and supports the gel. Preferably, therefore, the flexible sheet is resilient, at least in the direction of its width, preferably in all three directions. The gel may be provided with an embedded reinforcement, such as a flexible mesh. In addition to the gel and/or rubber, a mastic or other sealant material such as grease may be applied. The flexible sheet may optionally be provided with additional layers, such as a vapour barrier layer (e.g. aluminium) and/or a protective layer (e.g. polyethylene) for providing mechanical and/or UV (ultra-violet) protection.

Advantageously, the support members are provided with engagement means which provides a releasable engagement. In this way, so-called re-entry of the device is provided. Advantageously, the engagement means comprises a snap-fit connection. Alternatively, or additionally, the engagement means comprises clamps which may clamp the support members together. Preferably, the clamps are hingedly connected to a support member, thus reducing the number of separate parts on installation.

In an advantageous embodiment, the support members comprise strips having a substantially smaller width than the flexible sheet. That is, the support members only support the flexible sheet over a distance of approximately 1 to 3 cm from its edges. This allows the flexible sheet to be bent around the elongate object, substantially unhindered by the support members. The support members may be integral parts of the flexible sheet, e.g. sections of the same material having a greater thickness or members of a different material co-moulded into the sheet.

The support members are preferably brought together with facing main surfaces, the edge portions of the flexible sheet being located between the members. In this case, the support members, when brought together, would generally extend perpendicularly from the surface of the elongate object. It is, however, also possible to bring the support members together side by side, that is, lying in substantially the same plane. In the latter case it would be advantageous for the flexible sheet to extend beyond at least one of the support members so as to provide overlap for providing a longitudinal seal.

In a particularly advantageous embodiment the support members comprise strips which are shaped so as to follow the contours of the elongate object, in particular a transition in its diameter. That is, the strips may be flat but not straight. Instead, they are curved so as to conform to the surface of the elongate object.

Instead of strips covering only the longitudinal edge parts of the flexible sheet, the support members may advantageously comprise cover parts capable of enclosing at least part of the length of the elongate object. The edge portions of the flexible sheet are in this embodiment preferably supported by the edge portions of the cover parts. This embodiment has the advantage of being capable of fully enclosing the flexible sheet and thereby providing mechanical protection. These cover parts may also be shaped so as to follow the contours of the elongate object.

Preferably, the cover parts are hingedly connectable. This facilitates the installation of the device. The hinges may be permanent or releasable.

In the hinged embodiment, the flexible sheet may in effect be suspended between the edges of the cover. Preferably, the effective width of the flexible sheet at rest is less than the width of the device when hinged open. As a result, the flexible sheet has to be stretched to accommodate an elongate object in the device. In this way, tension is built up which assists the sealing. When suitably shaped the front and back edges of the cover parts may apply pressure on the sheet, thus assisting the sealing action at the ends of the device.

To stretch the flexible sheet when the device is closed around the object, the effective width of the sheet, at rest, should be less than the internal circumference of the, device. This internal circumference is defined by the surfaces of the cover parts facing the sheet. Depending on the shape of, the cover parts the internal circumference of the device may vary over its length, thus varying the tension in the sheet.

Alternatively, or additionally, the flexible sheet may have a non-uniform effective width and/or is at rest not flat so as to be non-uniformly stretched when pulled. This non-uniform stretching allows the tension in the sheet to be concentrated on specific areas, for example the ends of the device and/or the middle section, where sealing is required. In addition, the flexible may be provided with resilient members to apply resilient pressure on the sheet in those places where sealing is required. The resilient members may be constituted by pads or strips of foam rubber or another suitable resilient material.

The present invention further provides a method of enclosing an elongate object, comprising the steps of providing a flexible sheet having two substantially parallel edges; attaching a first support member along a first edge and a second support member along a second edge; folding the flexible sheet around the elongate object and bringing the support members together; and mutually engaging the support members so as to close the flexible sheet around the elongate object. It will be understood that the step of attaching the support members to the flexible sheet may be carried out when manufacturing the sheet so as to provide a device which is ready to be installed.

Advantageously, the flexible sheet, at rest, has an effective width which is smaller that the circumference of the elongate object. This causes at least part of the flexible sheet to be stretched when applied, thus creating a tensile force. Generally this tensile force will be created in those portions of the sheet where sealing is to be provided.

It is noted that for the stretching of the flexible sheet it is not necessary for two support members to extend along its edges. When the edges are made to overlap one support member could suffice, or the second support member could be spaced apart from an edge of the sheet.

The present invention additionally provides a kit-of-parts for forming a device as defined above.

BRIEF DESCRIPTION OF THE DRAWINGS

The invention will be explained in more detail below with reference to exemplary embodiments illustrated in the accompanying drawings, in which.

DETAILED DESCRIPTION OF THE ILLUSTRATED EMBODIMENTS

Figure 1:
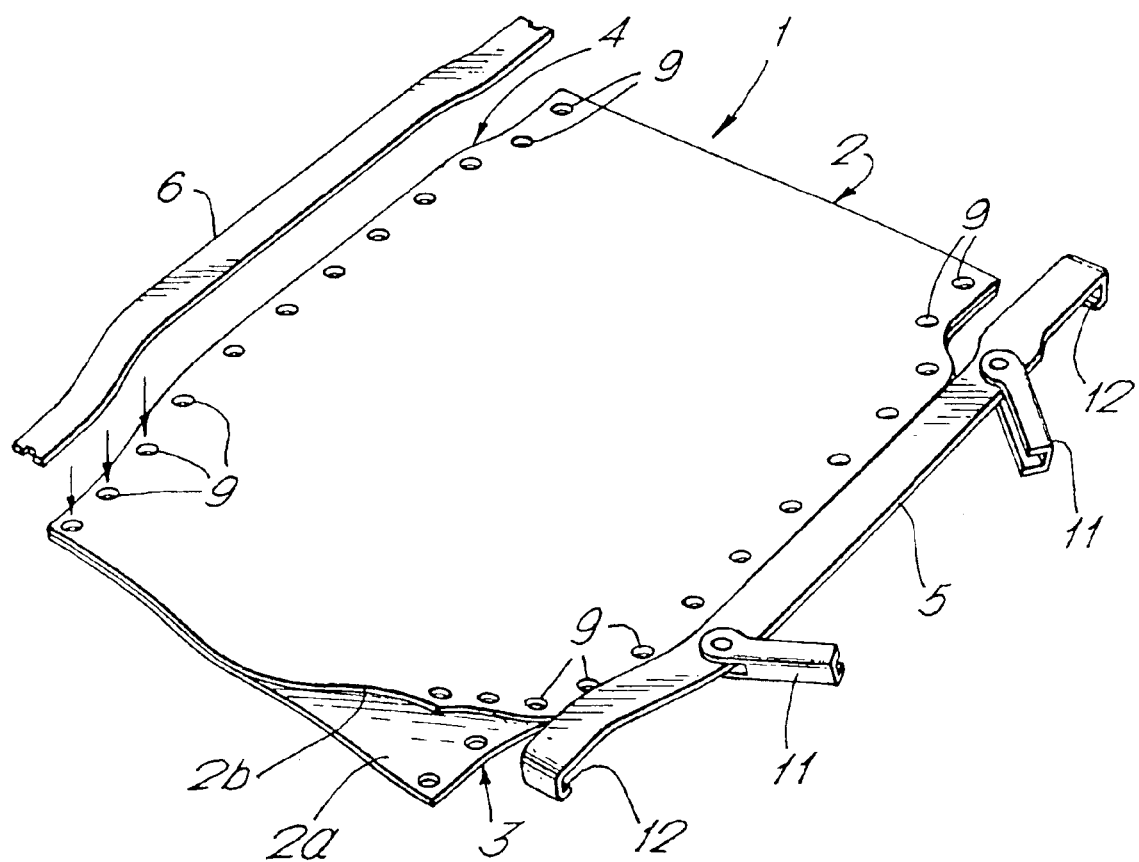
FIG. 1 schematically shows, in perspective, a first embodiment of a device according to the present invention prior to installation.

The first embodiment of the device 1 according to the present invention, shown merely by way of non-limiting example in FIG. 1, comprises a flexible sheet 2 and two support members 5 and 6. In the embodiment shown, the flexible sheet 2 consists of a sealing layer 2a and a protecting layer 2b. The sealing layer 2a may be constituted by a soft elastomer or a rubber/gel layer. The (optional) protecting layer 2b may be elastomeric. In other embodiments, however, the flexible sheet 2 may consist of a single layer of "pure" gel or a combination of gel and another material. This other material preferably is a material capable of withstanding tensile forces, for example a resilient material such as rubber.

Figure 2:
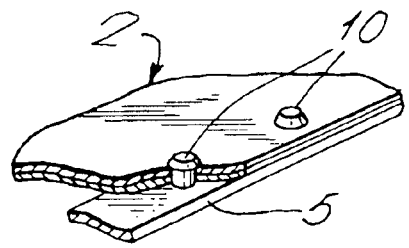
FIG. 2 schematically shows, in perspective, part of the device of FIG. 1 in more detail.

The side (longitudinal) edges 3 and 4 of the flexible sheet 2 are each provided with a row of holes 9 for accommodating attachment pins 10 of the support members 5 and 6. As shown in FIG. 2, the pins 10 are advantageously mushroom-shaped so as to have an automatic locking action. In the embodiment shown the pins 10 are integral with the support members, although it is of course possible to use separate pins. Although not specifically shown in FIG. 1, the holes 9 in the second support member 6 are preferably offset relative to their counterparts in the first support member 5 to avoid any interference of the pins 10 of the two support members.

Figure 5:
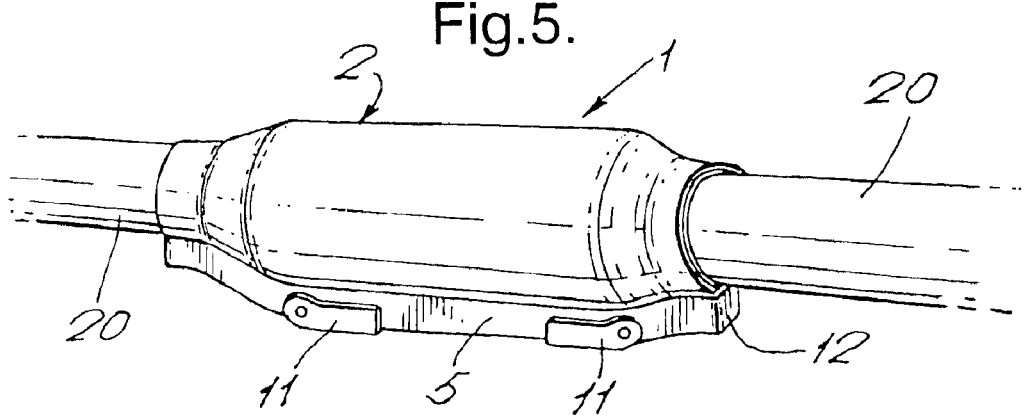
FIG. 5 schematically shows, in perspective, a third step in the installation of the device of FIG. 1.

Returning to FIG. 1 two clamps 11 are hingedly connected to the first support member 5 and serve to clamp the support members together when the device is applied, as shown in FIG. 5.

In this embodiment, the support members 5 and 6 are shown to be strips having a much smaller width than the flexible sheet 2. Depending on the dimensions of the device 1, the width of the strips may be approximately 0.2 to 5 cm, preferably about 1 to 3 cm.

Although both support members are substantially flat, the first support member 5 is shown to be provided with hooks 12 at its ends. These hooks 12 serve to clamp the ends of the support members together and to assist the clamps 11.

The support members 5 and 6 are substantially straight but deviate from a straight line towards their ends so as to conform to the transition region of a widened portion of an elongate object (see FIG. 5). In this way, a better sealing of e.g. cable splices is achieved as the support members, and the flexible sheet, more closely follow the contours of the cable splice.

Figure 3:
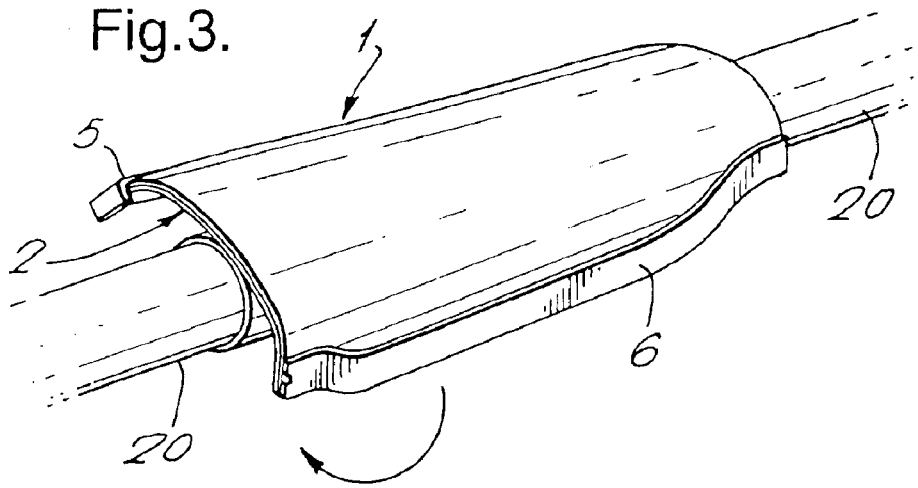
FIG. 3 schematically shows, in perspective, a first step in the installation of the device of FIG. 1.
Figure 4:
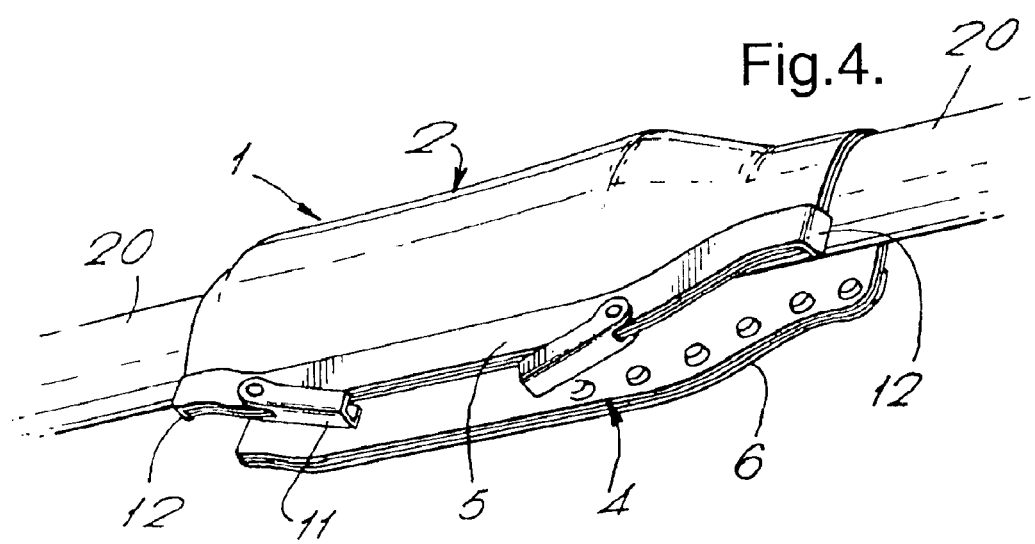
FIG. 4 schematically shows, in perspective, a second step in the installation of the device of FIG. 1.

The installation of the device on an elongate object, such as a cable splice, is shown in FIGS. 3–5. The device 1 is first placed on and substantially aligned with the cable 20, as shown in FIG. 3, and is folded around the cable 20, as shown by the arrow. Then, as shown in FIG. 4, the support members 5 and 6 are brought together and pulled so as to create tension in the flexible sheet. Stretching the sheet also accommodates variations in the diameter of the cable splice. Finally, as shown in FIG. 5, the support members 5 and 6 are mutually secured by means of the hooks 12 and the clamps 11. Any permanent radial tension maintains the sealing pressure on the cable.

As can be seen in FIGS. 4 and 5, the effective width of the sheet actually enclosing the cable splice is less than the total width of the sheet, the difference in this embodiment being equal to twice the width of the support members. In most embodiments the effective width will be less than the total width since some overlap of the edge portions is generally necessary to ensure a good sealing of the longitudinal seam of the device (it is noted that this "overlap" may be the arrangement shown in FIGS. 4 and 5, where the facing edge portions are both portions of the "inside" surface of the sheet, or an alternative arrangement in which an "inside" edge portion faces the "outside" of the sheet).

Figure 6:
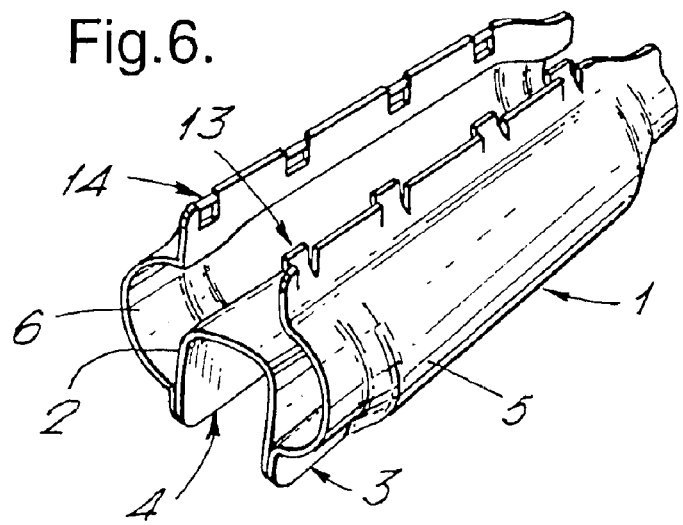
FIG. 6 schematically shows, in perspective, a second embodiment of the device according to the present invention prior to installation.

A second, preferred embodiment of the device 1 of the present invention is shown merely by way of non-limiting example in FIG. 6. In this embodiment, the support members 5 and 6 are constituted by relatively inflexible shells or cover parts which are capable of enclosing the cable splice. These shells may be made of e.g. hard plastic or metal. In the embodiment shown, the shape of the cover parts is adapted to the cable splice or cable connector it encloses and has a widened middle portion and narrower end portions. It is noted that the (longitudinal) edges 3 and 4 of the flexible sheet 2 are attached near the longitudinal edges of the cover parts (support members) 5 and 6.

In the embodiment shown, the cover parts are provided with hooks 13 and holes 14 respectively which may interlock to form a releasable hinge.

Figure 7:
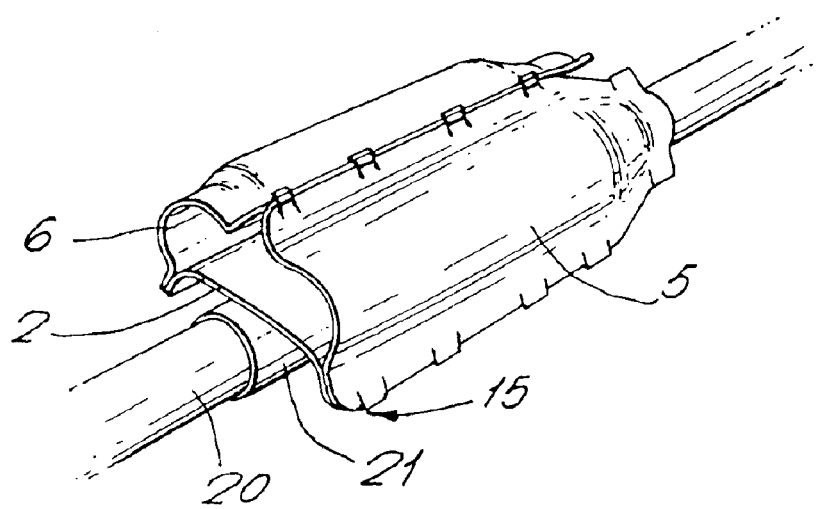
FIG. 7 schematically shows, in perspective, how the device of FIG. 6 is installed.

As shown in FIG. 7, the flexible sheet 2 has to be stretched in order to be folded around the cable splice 21. That is, at rest the effective width of the flexible sheet 2 (that is, the width of that part of the sheet which, when applied, faces the cable splice) is less than that of the folded-open cover parts. Or, in other words, the effective width of the flexible sheet 2 is smaller than the circumference of the cable splice. This automatic stretching of the flexible sheet adds to the sealing properties of the device.

Figure 8:
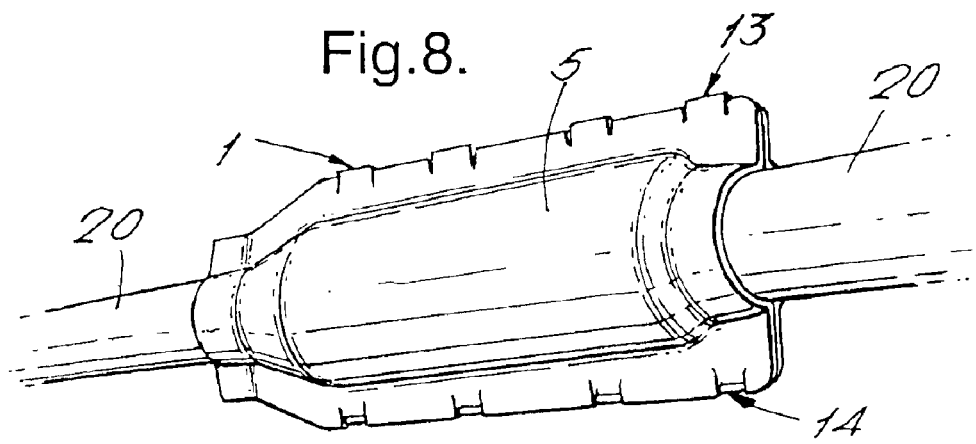
FIG. 8 schematically shows, in perspective, the device of FIG. 6 after installation.

When the cover parts are brought together to close the device 1, as shown in FIG. 8, they are mutually secured by engagement hooks 15 on the first cover part 5 which engage a facing rim of the second cover part 6.

The present invention may suitably be applied for sealing cable ports of cable closures.

Although the present invention is explained with reference to cables and cable splices, its applications are not so limited and may include enclosing various other elongate objects, such as masts, poles, branches and even containers, such as bottles. On the other hand some so-called elongate objects may have a relatively large width. Connectors for coaxial cables, for instance, may have a width that exceeds their length.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A device for enclosing an elongate object, the device comprising:
   a flexible sheet having two substantially parallel edges; and
   two support members provided with engagement means for mutually engaging the support members, wherein each support member extends along a respective edge of the flexible sheet and is attached thereto so that the device may be closed around the elongate object;
   wherein the flexible sheet consists of only a gel layer comprising a material capable of withstanding tensile forces encountered in use; and
   wherein the effective width of the flexible sheet at rest is less than the internal circumference of the device so as to stretch the flexible sheet when the device is closed around the elongate object.

2. Device according to claim 1, wherein the engagement means provides a releasable engagement.

3. Device according to claim 1, wherein the support members are shaped so as to follow the contours of a transition in a diameter of the elongate object.

4. Device according to claim 1, wherein the support members comprise strips having a substantially smaller width than the flexible sheet.

5. Device according to claim 1, wherein the support members comprise cover parts capable of enclosing at least part of the elongate object.

6. Device according to claim 5, wherein the cover parts are hingedly connectable.

7. Device according to claim 1, wherein the flexible sheet has at least one of a non-uniform effective width or is at rest not flat so as to be non-uniformly stretched when pulled.

8. Kit-of-parts for forming the device of claim 1 including a flexible sheet and at least two support members.

9. A method of enclosing an elongate object, the method comprising:
   providing a flexible sheet having two substantially parallel edges;
   attaching a first support member alone a first edge and a second support member along a second edge;
   folding and stretching the flexible sheet around the elongate object and bringing the support members together; and
   mutually engaging the support members so as to close the flexible sheet around the elongate object;
   wherein the flexible sheet consists of only a gel layer comprising a material capable of withstanding tensile forces encountered in use; and
   wherein the flexible sheet, at rest, has an effective width which is smaller than a circumference of the elongate object so as to stretch at least some portions of the flexible sheet when it is closed around the elongate object.

10. Method according claim 9, wherein the flexible sheet has at rest a non-uniform effective width or is at rest not flat so as to be non-uniformly stretched when pulled.

11. Method according to claim 9, wherein the support members comprise strips having a substantially smaller width than the flexible sheet.

12. Method according to claim 9, wherein the support members comprise cover parts capable of enclosing the elongate object.

13. Method according to claim 9, wherein the elongate object comprises a cable splice.

14. An enclosing device for an elongate object comprising:
- a flexible single layer gel sheet having two substantially parallel edges and being configured to withstand tensile forces when wrapped around the elongate object;
- a first substantially rigid support member coupled to the gel sheet proximate one of the edges;
- a second substantially rigid support member coupled to the gel sheet proximate the other of the edges; and
- a connector that connects the first and second support members when the gel sheet is wrapped around the elongate object;
- wherein the support members comprise half shell cover members each having a longitudinal end coupled to the gel sheet and being hinged together at longitudinal ends thereof displaced from the ends coupled to the gel sheet and wherein the gel sheet has a transverse width less than a circumference of the elongate object to stretch the gel sheet when wrapped around the elongate object.

15. The device of claim 14 wherein the gel sheet comprises gel in combination with a support structure that withstands tensile forces when the gel sheet is wrapped around the elongate object.

16. The device of claim 14 wherein the support members are shaped to substantially follow contours of a transition in a diameter of the elongate object before the gel sheet is wrapped around the elongate object.

17. An enclosing device for an elongate object comprising:
- a flexible sheet having two substantially parallel edges;
- a first half shell cover member coupled to the flexible sheet proximate one of the edges;
- a second half shell cover member coupled to the flexible sheet proximate the other of the edges;
- wherein the half shell cover members are hinged together at longitudinal ends thereof displaced from ends coupled to the flexible sheet and wherein the flexible sheet has a transverse width less than a circumference of the elongate object to stretch the flexible sheet when wrapped around the elongate object; and
- a connector that connects the first and second half shell cover members at the ends thereof coupled to the flexible sheet when the flexible sheet is wrapped around the elongate object.

18. The device of claim 17 wherein the half shell cover members are shaped to substantially follow contours of a transition in a diameter of the elongate object before the flexible sheet is wrapped around the elongate object.

* * * * *